(12) United States Patent
Pfister et al.

(10) Patent No.: US 9,144,772 B2
(45) Date of Patent: Sep. 29, 2015

(54) METHOD FOR MONITORING AN SCR CATALYST

(71) Applicant: Robert Bosch GmbH, Stuttgart (DE)

(72) Inventors: Tobias Pfister, Stuttgart (DE); Arthur Bastoreala, Remseck Am Neckar (DE); Alexander Franz, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 171 days.

(21) Appl. No.: 13/742,646

(22) Filed: Jan. 16, 2013

(65) Prior Publication Data

US 2013/0202506 A1  Aug. 8, 2013

(30) Foreign Application Priority Data

Feb. 7, 2012 (DE) .......................... 10 2012 201 749

(51) Int. Cl.
*G01N 31/10* (2006.01)
*B01D 53/94* (2006.01)
*F01N 11/00* (2006.01)

(52) U.S. Cl.
CPC ............ *B01D 53/9495* (2013.01); *F01N 11/00* (2013.01); *F01N 2900/1616* (2013.01); *F01N 2900/1621* (2013.01); *Y02T 10/47* (2013.01)

(58) Field of Classification Search
USPC .............. 436/37, 50, 113, 159, 181
See application file for complete search history.

(56) References Cited

U.S. PATENT DOCUMENTS

| 8,499,545 | B2 | 8/2013 | Busch et al. | |
| 2007/0144151 | A1* | 6/2007 | Lueders et al. | 60/286 |
| 2009/0272099 | A1* | 11/2009 | Garimella et al. | 60/277 |
| 2010/0326051 | A1* | 12/2010 | Busch et al. | 60/274 |
| 2011/0113752 | A1* | 5/2011 | Christner et al. | 60/274 |
| 2011/0252767 | A1* | 10/2011 | Lin et al. | 60/274 |
| 2011/0296905 | A1 | 12/2011 | Bastoreala et al. | |
| 2011/0314793 | A1* | 12/2011 | Mullins et al. | 60/274 |
| 2012/0067114 | A1* | 3/2012 | Clerc et al. | 73/114.75 |
| 2012/0096837 | A1* | 4/2012 | Yacoub | 60/274 |
| 2012/0137657 | A1* | 6/2012 | Dahl et al. | 60/274 |
| 2013/0186067 | A1* | 7/2013 | Dahl et al. | 60/274 |
| 2014/0056790 | A1* | 2/2014 | Geveci et al. | 423/212 |

* cited by examiner

*Primary Examiner* — Arlen Soderquist
(74) *Attorney, Agent, or Firm* — Michael Best & Friedrich LLP (57) ABSTRACT

In a method for monitoring an SCR catalyst, in particular for monitoring the storage capacity of the SCR catalyst for ammonia, superstoichiometric metering (69) of reducing agents into the SCR catalyst is performed for diagnostic purposes, and the storage capacity of the SCR catalyst is inferred in accordance with at least one characteristic value, which is dependent on the nitrogen oxide conversion rate of the SCR catalyst. In this method, a conditioning phase (67) for setting a specifiable operating point (68) is carried out before the superstoichiometric metering (69) of reducing agents.

12 Claims, 8 Drawing Sheets

METHOD FOR MONITORING AN SCR CATALYST

BACKGROUND OF THE INVENTION

The present invention relates to a method for monitoring an SCR catalyst, in particular for monitoring the storage capacity of the SCR catalyst for ammonia.

The prior art includes methods and devices for operating an internal combustion engine, in particular on motor vehicles, in the exhaust zone of which an SCR catalyst (Selective Catalytic Reduction) is arranged that reduces the nitrogen oxides (NOx) contained in the exhaust gas from the internal combustion engine to nitrogen in the presence of a reducing agent. The proportion of nitrogen oxides in the exhaust gas can thereby be considerably reduced. To enable the reaction to take place, ammonia ($NH_3$) is required, this being added to the exhaust gas.

Stricter laws in the area of diagnosis of components relevant to emissions require the monitoring of all exhaust gas aftertreatment components as part of On-Board Diagnosis (OBD) and also monitoring of the sensors used for compliance with OBD limits. The OBD limits are generally specified as a multiple of the legally stipulated emissions limits. When using an SCR catalyst, compliance with the OBD limit for nitrogen oxides must be ensured. The monitoring functions must ensure that overshooting of the corresponding limit due to aging of or damage to the SCR catalyst is reliably detected.

The reduction of the nitrogen oxide molecules from the exhaust gas takes place on the catalyst surface in the presence of ammonia as a reducing agent. The reducing agent is metered in in the form of an aqueous urea solution, which is injected upstream of the catalyst by means of a metering device. The desired metering rate is determined according to requirements in an electronic control unit, with the strategies for operation and monitoring of the SCR system generally being stored in the control unit.

SCR catalysts that are usually used store ammonia on the catalyst surface. Reduction of nitrogen oxides to elemental nitrogen, i.e. NOx conversion, in the SCR catalyst is all the more successful, the larger the amount of reducing agent available in the catalyst. As long as the storage capacity of the SCR catalyst is not yet exhausted, metered reducing agent which is not consumed for conversion is stored. If less reducing agent is made available by the metering unit than is required for conversion of the nitrogen oxides currently present in the exhaust gas, the ammonia stored on the catalyst surface is used, with the result that the NOx conversion taking place at the catalyst surface lowers the $NH_3$ level of the catalyst.

SCR systems that are currently employed often have metering strategies which include level control of $NH_3$ in the catalyst. With a level control system of this kind, an operating point is set in the form of a setpoint for the $NH_3$ level in the SCR catalyst. This operating point is generally selected in such a way that the $NH_3$ level is high enough, on the one hand, to ensure a high NOx conversion rate and a buffer for brief NOx spikes in the exhaust gas. On the other hand, the setpoint should be as far from the maximum storage capacity as is necessary to avoid ammonia slip through the catalyst. Such a breakthrough of ammonia occurs especially when the ammonia metered in is not used either to reduce the nitrogen oxides or to replenish the $NH_3$ store, that is to say that the $NH_3$ cannot be absorbed on the catalyst surface either. Since ammonia has a damaging effect on health and on the environment at high concentrations, breakthroughs of pure ammonia as $NH_3$ slip should be avoided as far as possible.

Owing to the nature of the system, level control in the SCR catalyst, including the setting of the operating point for the $NH_3$ level, is subject to large tolerances. This is due in part to the fact that there are currently no suitable measuring systems for directly measuring $NH_3$ for use in a motor vehicle. On the contrary, use is generally made of nitrogen oxide sensors that have cross sensitivity for $NH_3$, meaning that the sensor signal is a combined signal comprising NOx and $NH_3$. Moreover, the reducing agent $NH_3$ is not metered in directly but is generally made available in the form of an aqueous urea solution. This aqueous urea solution is converted into $NH_3$ and $CO_2$ in the exhaust system upstream of the SCR catalyst by thermal processes. The degree of conversion depends on many different factors and cannot be reliably estimated at all operating points. Finally, a nitrogen oxide sensor upstream of the SCR catalyst is often dispensed with in order to reduce costs, making it necessary to resort to a model value for the nitrogen oxide concentration currently prevailing in the exhaust gas, from which the desired metering rate is then determined.

An OBD-II-compliant SCR system has at least a nitrogen oxide sensor downstream of the SCR catalyst. As already mentioned, NOx sensors that are currently in common use indicate a combined signal comprising NOx and $NH_3$. A rise in the sensor signal from a nitrogen oxide sensor arranged downstream of the SCR catalyst can therefore indicate either a falling NOx conversion rate, i.e. a rise in the NOx concentration, or a breakthrough of pure ammonia, i.e. a rise in the $NH_3$ concentration. Direct discrimination between NOx and $NH_3$ is not possible.

It is known that the $NH_3$ storage capacity of an SCR catalyst is greatly reduced with progressive aging, especially due to thermal processes. The practice of using the $NH_3$ storage capacity of an SCR catalyst as a diagnostic feature for monitoring the catalyst is therefore likewise already known. German Offenlegungsschrift DE 10 2007 040 439 A1, for example, describes a monitoring strategy for an SCR catalyst in which the $NH_3$ storage capacity is determined and used as a feature for indicating the aging of or damage to the catalyst. In this strategy, the SCR catalyst is initially filled with reducing agent up to the maximum achievable $NH_3$ storage capacity by superstoichiometric metering of the reducing agent in the form of overmetering, that is to say that the maximum quantity of $NH_3$ is absorbed at the catalyst surface. As soon as the maximum storage capacity is reached, unbound $NH_3$ breaks through the catalyst. Owing to the cross sensitivity of the nitrogen oxide sensor downstream of the catalyst to $NH_3$, this $NH_3$ slip is detected indirectly in the form of an increased sensor signal, which can be measured as an assumed dip in the NOx conversion rate. The maximum $NH_3$ storage capacity that can be detected by means of the breakthrough of $NH_3$ is used as a defined starting point for diagnosis. After the $NH_3$ breakthrough has been detected, the metering of reducing agent is reduced relative to normal metering (undermetering) or completely shut down. During this process, the stored $NH_3$ mass, i.e. the $NH_3$ absorbed in the SCR catalyst, is gradually lowered again through use during the reduction of nitrogen oxides. During this "emptying test", the SCR efficiency or other characteristic values dependent on the NOx conversion rate can be determined, and the usable $NH_3$ storage capacity of the catalyst can be inferred indirectly therefrom.

There are various known versions of this monitoring strategy for avoiding the disadvantageous $NH_3$ slip that occurs in the course of this monitoring strategy and for reducing the effect on exhaust gas aftertreatment of the metering carried out in the course of monitoring. One version is suitable particularly for SCR catalysts with a very high $NH_3$ storage capacity when new and a greatly reduced $NH_3$ storage capacity when aged. In this version, the overmetering phase is not always ended only after the detection of $NH_3$ slip but as soon as an $NH_3$ level in the SCR catalyst is reached, said level having been selected as a function of temperature. This selected $NH_3$ level is specified in such a way that it lies between the maximum storage capacity of the catalyst when new and the maximum storage capacity of an aged catalyst. If this level can be reached without the occurrence of $NH_3$ slip, it can be assumed that the catalyst is not yet aged to the extent that it must be considered faulty. The advantage with this version is that monitoring can be successfully ended without the occurrence of an effect on emissions in the form of $NH_3$ (by $NH_3$ slip during overmetering) or due to NOx (in the case of a low conversion rate in the emptying test). The disadvantage here is that only a catalyst that is as good as new can be detected by this method. An aged catalyst cannot be assessed during the overmetering phase.

In order to increase the accuracy of diagnosis in this version of the monitoring strategy, there is a known practice of metering in a defined quantity of $NH_3$ selected as a function of temperature in the overmetering phase before making the transition to the emptying test. The effect is that, in the case of an aged SCR catalyst with a storage capacity that is too low for this quantity of $NH_3$, the excess quantity of $NH_3$ that is being metered in appears in the sensor signal of the nitrogen oxide sensor downstream of the SCR catalyst. In this case, the NOx conversion rate derived from this sensor signal is artificially lowered, enabling the NOx conversion rate in the overmetering phase to be used as an additional diagnostic feature. Owing to the tolerances in the system, however, it is not possible to ensure that the amount of excess $NH_3$ metered in is always the same in the diagnosis of an aged catalyst since the calculation of the $NH_3$ level during the overmetering phase is difficult. In practice, therefore, the emptying test must also be carried out in this version, despite the additional diagnostic feature in the overmetering phase, and this test disadvantageously leads to increased NOx emissions due to the falling NOx conversion rate.

Given this situation, it is the underlying object of the invention to improve accuracy in the monitoring of the storage capacity of an SCR catalyst for ammonia and furthermore to reduce the disadvantageous effect of conventional diagnostic methods on emissions of nitrogen oxides and/or of ammonia.

SUMMARY OF THE INVENTION

The method according to the invention for monitoring an SCR catalyst and, in particular, for monitoring the storage capacity of the SCR catalyst for ammonia is distinguished by the fact that superstoichiometric metering of reducing agent into the SCR catalyst is performed for diagnostic purposes, and the storage capacity of the SCR catalyst is inferred in accordance with at least one characteristic value, which is dependent on the nitrogen oxide conversion rate of the SCR catalyst. Central to the method is the fact that a conditioning phase, in which a specifiable operating point is set, is carried out before the superstoichiometric metering of reducing agent. By setting a specifiable operating point, the accuracy of the calculation of the $NH_3$ level of the SCR catalyst during the overmetering phase carried out as part of monitoring is significantly improved. Even during the overmetering phase itself, it is possible in this case to discriminate between a catalyst which is as good as new, that is to say which has a high storage capacity, and an aged SCR catalyst with a reduced storage capacity. One particular advantage here is that reliable judgments can already be made on the storage capacity of the SCR catalyst after the phase with superstoichiometric metering has been carried out, thus making it possible to dispense with a subsequent emptying test that takes place in conventional diagnostic methods. Dispensing with the emptying test makes it possible to considerably shorten the time for carrying out diagnosis. Moreover, the increased nitrogen oxide emissions which usually occur when carrying out the emptying test do not occur.

The conditioning phase according to the invention for setting a specifiable operating point can be carried out, for example, in the course of the already known monitoring strategies described at the outset. For example, the conditioning phase according to the invention can be carried out before superstoichiometric metering of reducing agent up to the maximum achievable $NH_3$ storage, detectable from the $NH_3$ slip, is carried out for diagnostic purposes. It is possible to dispense with the emptying test which normally follows. Moreover, the conditioning phase according to the invention can also be employed in the version of the monitoring strategy in which the overmetering phase is ended when an $NH_3$ level in the SCR catalyst selected as a function of temperature is reached, the $NH_3$ level selected as a function of temperature lying between the maximum storage capacity of the catalyst when new and the maximum storage capacity of an aged catalyst. Moreover, the conditioning phase according to the invention can also be employed in the version of the monitoring strategy in which a defined quantity of $NH_3$ selected as a function of temperature is metered in the overmetering phase. In all cases, it is possible to dispense with a subsequent emptying test since, by virtue of the starting of the overmetering phase at a defined operating point, significant information on the storage capacity of the catalyst can be obtained merely by observing the variation in the NOx conversion rate during the overmetering phase. Above all, the accuracy of conclusions on the $NH_3$ storage capacity can be increased.

In a preferred embodiment of the method according to the invention, to set the specifiable operating point in the conditioning phase, substoichiometric metering of reducing agent is performed. During this process, the $NH_3$ store of the SCR catalyst is emptied until the conversion rate of the SCR catalyst is below the conversion rate that is to be expected in the case of normal metering. Here, the term "normal metering" is intended to mean metering governed by a level controller. Level control is based on superstoichiometric metering if the current $NH_3$ level is less than the desired level. If the current $NH_3$ level is greater than the desired level, substoichiometric metering is carried out. This is the conventional way of controlling the level. In this context, stoichiometric metering means that the amount of $NH_3$ made available is that which is theoretically required for complete NOx conversion. Since, in practice, the conversion rate is generally below 100%, slightly substoichiometric metering is the outcome on average in the case of conventional control of the desired level.

According to the invention, the specifiable operating point is set by performing substoichiometric metering until the conversion rate that is obtained with normal metering is undershot. In this state or at this operating point, the $NH_3$ level is known with high accuracy from measurements of the relationship between the $NH_3$ level and the efficiency of the catalyst or the NOx conversion rate, and thus forms a suitable starting point for the superstoichiometric metering of reducing agent carried out for diagnostic purposes. Moreover, the $NH_3$ level at this operating point is generally so low in terms of the absolute values that the propagation of any error with this initial value does not lead to high relative deviations during the subsequent calculation of the level during the overmetering phase.

The reaching of the desired operating point can be observed, for example, by means of appropriate observation of the conversion rate of the SCR catalyst. The metering of the reducing agent is described below using the variable $\alpha$, where $\alpha=1$ corresponds to stoichiometric metering. In this case, the amount of $NH_3$ made available is that which is at least theoretically necessary for complete conversion of the nitrogen oxides currently present in the exhaust gas. The nitrogen oxide conversion rate is described by the variable $\eta$. With substoichiometric metering, the maximum conversion rate $\eta$ is determined by the supply of reducing agent, thus giving a limiting conversion rate of $\eta=\alpha$. However, this limiting conversion rate is not obtained directly since, first of all, there is still a sufficient supply of reducing agent in the form of stored or absorbed $NH_3$ in the SCR catalyst. Instead, the conversion rate gradually approaches the limiting conversion rate, i.e. the target value. The desired or specifiable operating point is reached when $\eta \leq \alpha$ is obtained on a sustained basis. A characteristic value of $\alpha=0.5$, for example, can be specified in order to set the desired operating point.

Determination of the nitrogen oxide conversion rate can be accomplished in various ways. For example, the conversion rate in the SCR catalyst can be calculated from the measured nitrogen oxide sensor signals if a nitrogen oxide sensor is provided upstream and downstream of the SCR catalyst. If only one nitrogen oxide sensor is installed in the system and arranged downstream of the SCR catalyst, the conversion rate can be calculated from the nitrogen oxide sensor signal downstream of the SCR catalyst and a model value for the nitrogen oxide emissions upstream of the SCR catalyst can be calculated in the engine control unit, for example. If no nitrogen oxide sensors are provided in the system, the conversion rate can be determined by means of the model value for the nitrogen oxide conversion rate calculated by means of the metering strategy although, in this case, a loss of accuracy may be expected. Preferably, a number of these possibilities mentioned can be combined, provided the appropriate hardware conditions are present. It is thereby possible to further increase the accuracy of operating point detection. Moreover, further additional conditions can be taken into account in order to further improve detection of the specifiable operating point. In a particularly preferred version, for example, a model value for the $NH_3$ level of the SCR catalyst and/or the $NH_3$ level balance of the storage capacity monitoring system, calculated, in particular, by means of sensor values, can additionally be considered. The specifiable operating point can be assumed to have been reached when the $NH_3$ level is below a specifiable limit at a time at which $\eta \leq \alpha$. Which conditions and/or which combinations of conditions are considered in order to detect that the desired operating point has been reached can be defined in a manner specific to the use. For example, the appropriate conditions can be determined by means of measurements on the respective vehicle or on the exhaust system as part of the application of the storage capacity monitoring system.

In a particularly preferred embodiment of the method according to the invention, which provides an alternative or an addition to observation of the NOx conversion rate at discrete times, detection of the specifiable operating point takes place through assessment of the time variation thereof. Thus, it is possible, from a negative gradient of the conversion rate, to infer the imminent approach to or imminent reaching of the target value, i.e. of the desired operating point, at an early stage, for example.

In another alternative embodiment of the detection of the operating point, operating conditions which meet the above-mentioned conditions for the conditioning phase in any case can be used selectively as enabling conditions for diagnosis. In particular, depending on the situation, it is possible to dispense with the conditioning phase if such operating conditions are detected. Thus, it is possible to infer that the specifiable operating point has been reached if operating conditions are detected in which the conversion rate of the SCR catalyst is below the conversion rate to be expected in the case of normal metering. The operating conditions used for the conditioning phase and for the method according to the invention are conditions that are present in any case, according to the situation, without further intervention. In these embodiments of the method according to the invention, the effect on emissions from preconditioning or from the conditioning phase can be minimized even further by shortening them.

The characteristic value (characteristic value $\alpha$) for substoichiometric metering is preferably selected in such a way that it lies below the characteristic value for stoichiometric metering in the case of an aged SCR catalyst. Metering in the conditioning phase is thus preferably defined in such a way that the metering characteristic value $\alpha$ is always below the NOx conversion rate that can be achieved with normal metering in the case of an aged catalyst. In the monitoring strategy according to the invention, account is thereby taken of the possibility that the catalyst to be monitored already has a reduced $NH_3$ storage capacity due to the aging effects that may be present.

The invention furthermore comprises a computer program which executes all the steps of the method described when it is executed on a computing device or a controller. The invention furthermore comprises a computer program product comprising program code which is stored on a machine-readable medium, for carrying out the method according to the invention when the program is executed on a computing device or a controller. Implementing the monitoring method according to the invention as a computer program has the advantage that this method can be readily employed even on existing vehicles, for example, in order in this way to be able to exploit the advantages of the monitoring strategy according to the invention.

Further features and advantages of the invention will emerge from the following description of illustrative embodiments in conjunction with the drawings. At the same time, the individual features can each be implemented individually or in combination with each other.

DETAILED DESCRIPTION

Figure 1:
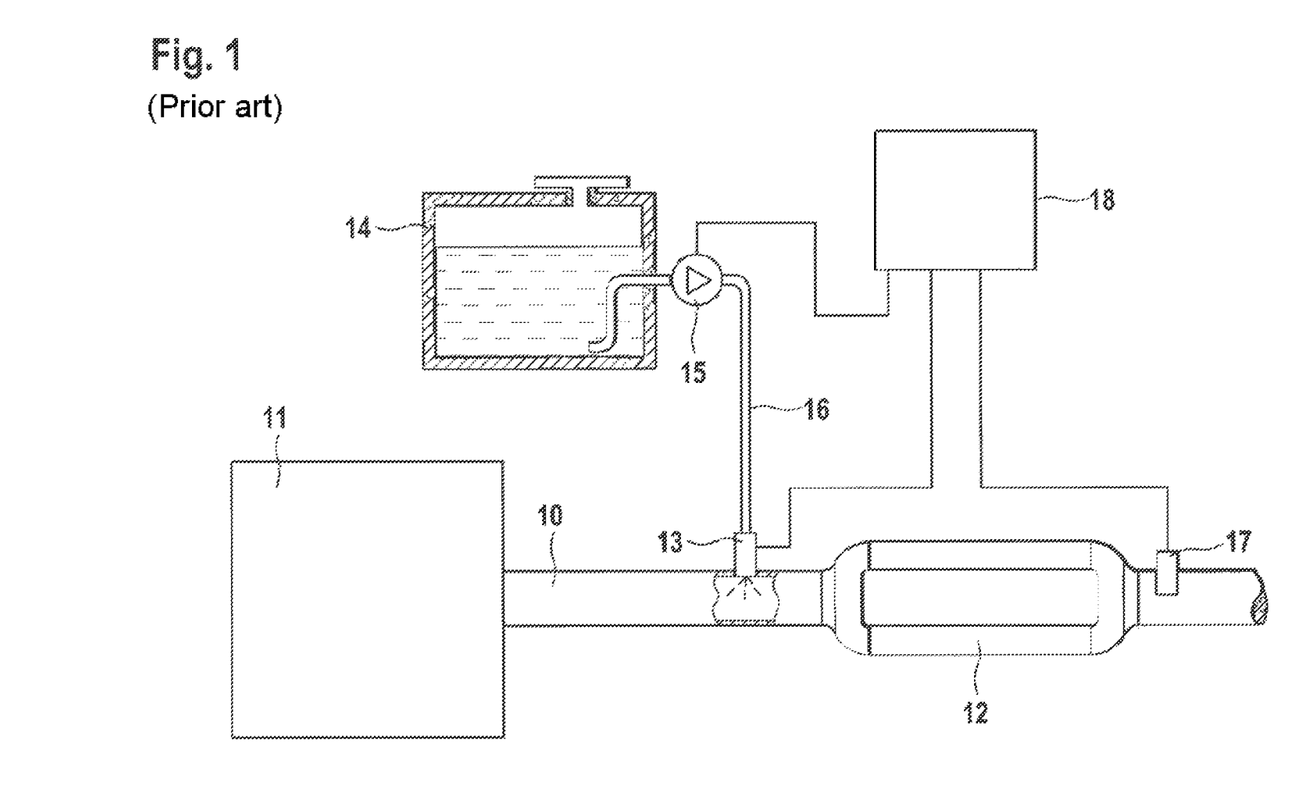
FIG. 1 shows a schematic representation of the components of an SCR catalyst system (prior art)

FIG. 1 first of all shows, in a schematic way, those components of an SCR catalyst system which are known per se. Arranged in the exhaust line 10 of an internal combustion engine 11 is an SCR catalyst 12, which selectively reduces nitrogen oxides in the exhaust gas by selective catalytic reduction (SCR). Ammonia ($NH_3$) is used as a reagent or reducing agent for the reaction. Since ammonia is a toxic substance, ammonia is obtained from the non-toxic carrier substance urea. The urea is injected into the exhaust line 10 upstream of the SCR catalyst 12 as a liquid aqueous urea solution via the metering device 13 in accordance with requirements. The aqueous urea solution is stored in a reducing agent tank 14, from which the solution is fed to the actual metering device 13 by means of a feed pump 15 via the delivery line 16. A nitrogen oxide sensor 17 is provided downstream of the SCR catalyst 12 to monitor the nitrogen oxide concentrations in the exhaust gas. In other systems, another nitrogen oxide sensor can be provided upstream of the SCR catalyst 12. Metering and the detection and evaluation of the nitrogen oxide values are controlled in an evaluation unit 18, in particular in a control unit of the SCR catalyst system or in a controller of the internal combustion engine.

Figure 2:
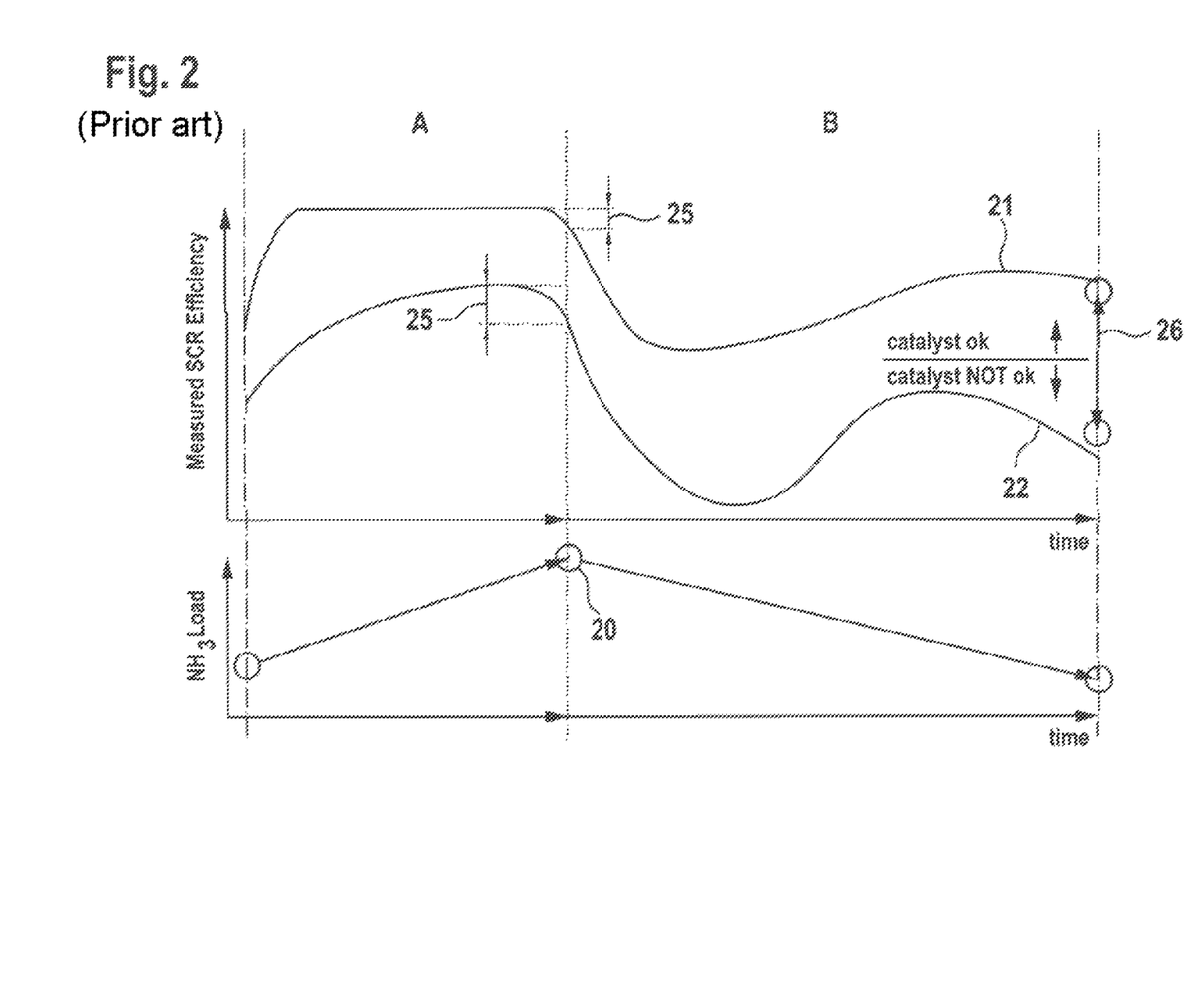
FIG. 2 shows a schematic representation of the time variation of $NH_3$ storage in an SCR catalyst (lower part) and of the measured SCR efficiency (upper part) during the conventional monitoring of an SCR catalyst.

FIG. 2 shows, in a schematic way, the time variation of a conventional monitoring strategy of the SCR catalyst in respect of the loading of the SCR catalyst with $NH_3$ (lower part) and in respect of the measured SCR catalyst efficiency (upper part), i.e. the NOx conversion rate. In the method for monitoring the catalyst, the capacity of the catalyst for storing $NH_3$ or absorbing $NH_3$ is used as a distinguishing feature for the aging of or damage to the catalyst. The lower part of the figure shows the time variation of the stored $NH_3$ mass ($NH_3$ load) in the SCR catalyst. In a first phase (overmetering phase A), the SCR catalyst is initially filled with reducing agent up to the maximum achievable $NH_3$ storage by superstoichiometric metering of reducing agent. A defined starting point for the diagnostic method is thereby reached. The point at which the maximum $NH_3$ storage in the SCR catalyst is reached is denoted by 20. As soon as the maximum loading with $NH_3$ has been reached, no more $NH_3$ can be stored, and therefore the additional $NH_3$ which is metered in leaves the SCR catalyst again unused ($NH_3$ slip). The nitrogen oxide sensor 17 arranged downstream of the SCR catalyst detects this $NH_3$ as an increased nitrogen oxide signal owing to the cross sensitivity for $NH_3$, i.e. the NOx conversion rate calculated by means of the nitrogen oxide sensor signal falls. The metering of reducing agent is then reduced relative to normal metering in an undermetering phase B or is shut down, with the result that the stored $NH_3$ mass is gradually removed again by the NOx conversion taking place in the SCR catalyst (emptying test). During this undermetering phase, the SCR efficiency is detected on the basis of the nitrogen oxide signals, and the usable $NH_3$ storage capacity of the SCR catalyst is determined indirectly therefrom. Instead of the measured SCR efficiency, as illustrated in FIG. 2, it is also possible for other characteristic values dependent on the NOx conversion rate of the SCR catalyst to be analyzed. Curve 21 shows the behavior of a new or fully functional catalyst with an adequate $NH_3$ storage capacity (catalyst ok). Curve 22 shows the behavior of an aged SCR catalyst with an inadequate $NH_3$ storage capacity (catalyst NOT ok). At the end of the overmetering phase A, the measured SCR efficiency falls. At this time, the signal of the nitrogen oxide sensor 17 arranged downstream of the SCR catalyst rises due to the $NH_3$ which can no longer be stored in the SCR catalyst. This rise in the signal of the cross-sensitive nitrogen oxide sensor is an expression of the falling measured NOx conversion rate (measured efficiency). The drop in SCR efficiency, denoted by 25 in FIG. 2, indicates the end of the overmetering phase A. The transition to the undermetering phase B then takes place, within which the characteristic values determined depend on the NOx conversion rate and from which the usable $NH_3$ storage capacity can be determined indirectly. The determination of these characteristic values 26 is indicated schematically in FIG. 2.

Figure 3:
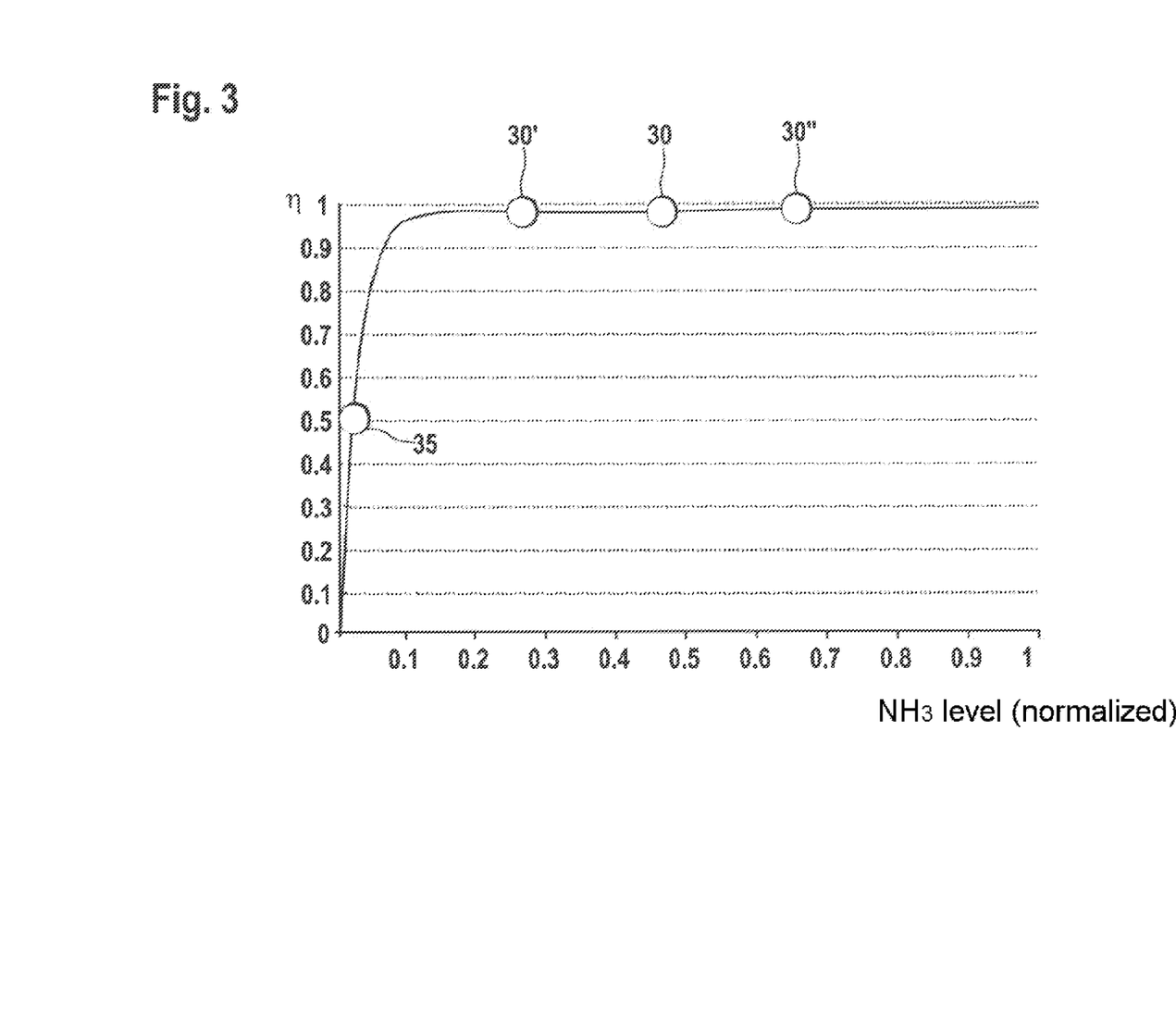
FIG. 3 shows a schematic representation of the relationship between the NOx conversion rate ($\eta$) and the $NH_3$ level.

FIG. 3 represents the relationship between the NOx conversion rate $\eta$ and the $NH_3$ level schematically. From this it can be seen that, when there is a rise in the $NH_3$ mass stored in the SCR catalyst brought about by superstoichiometric metering of the reducing agent, the NOx conversion rate must rise. If the catalyst has already been operated at the optimum operating point, the NOx conversion rate remains the same. However, if the measured NOx conversion rate falls or the sensor signal of the NOx sensor cross-sensitive to $NH_3$ downstream of the SCR catalyst nevertheless rises, this is due to distortion of the sensor signal by free $NH_3$ downstream of the SCR catalyst. In this case, it can be assumed that the maximum storage capacity of the SCR catalyst is exhausted and thus that the excess $NH_3$ mass metered is passing the catalyst surface unused ($NH_3$ slip). FIG. 3 shows the operating points 30, 30', 30" in the case of normal metering, which, in practice, is generally slightly substoichiometric on average, as already explained. Point 30 shows the normal operating point, which represents a model value. Points 30' and 30" indicate possible actual operating points. Conventional monitoring strategies are based on these normal operating points, especially on the model value 30 for the normal operating point. Due to the deviations in the possible actual operating points, e.g. 30' and 30", there may be considerable inaccuracies in monitoring. The monitoring method according to the invention therefore provides a conditioning phase before the performance of superstoichiometric metering for diagnostic purposes, a specifiable operating point being set in the conditioning phase. This specifiable operating point 35 lies on the falling branch of the relationship illustrated in FIG. 3 between the level and the efficiency.

The normal operating point 30 thus represents a level setpoint during the standard operation of the metering device. Owing to system tolerances and inadequate measuring systems, especially the usual lack of $NH_3$ sensors, the actual position of the operating point can deviate significantly from the setpoint 30 without this being measurable by way of the conversion rate. Thus, the NOx conversion rate differs only insignificantly at the possible operating points 30' and 30" from the model value 30. In the case of the operating point 35 provided according to the invention, in contrast, which is set as the initial situation for superstoichiometric metering for diagnostic purposes, it is possible to infer the $NH_3$ level from the NOx conversion rate with relatively high accuracy. Owing to the setting of this defined operating point as a starting point for the actual diagnostic phase, it is already possible to obtain significant information on the $NH_3$ storage capacity of the SCR catalyst in the subsequent phase of superstoichiometric metering. It is therefore possible to dispense partially or completely with the customarily performed emptying test, thereby making it possible to significantly reduce the disadvantageous effect on emissions of the diagnostic method. The accuracy of the information on the $NH_3$ storage capacity which is obtained during the superstoichiometric metering is also significantly increased over known monitoring strategies. Moreover, the duration of diagnosis is shortened.

Figure 4A:
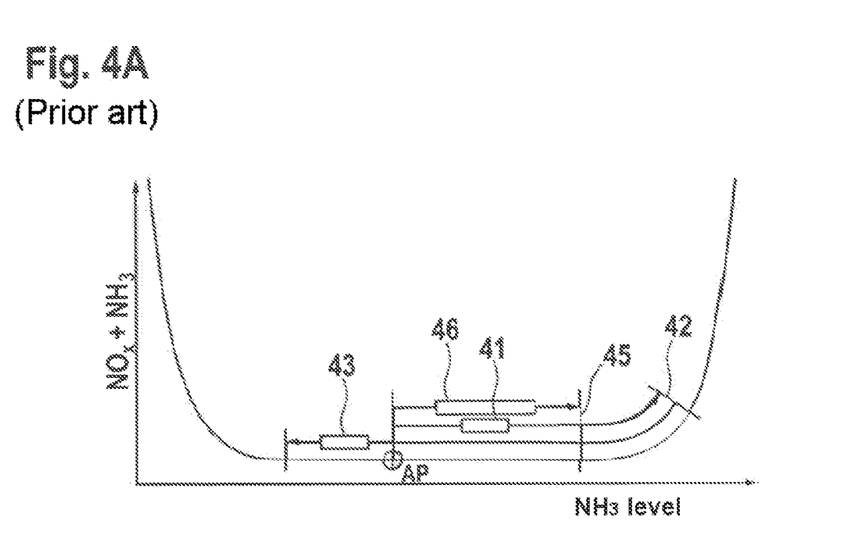
FIG. 4 shows a schematic representation of the relationship between the nitrogen oxide sensor signal downstream of the catalyst and the $NH_3$ level in the case of a catalyst which is as good as new (A) and an aged catalyst (B) in the case of conventional monitoring of $NH_3$ storage capacity.
Figure 4B:
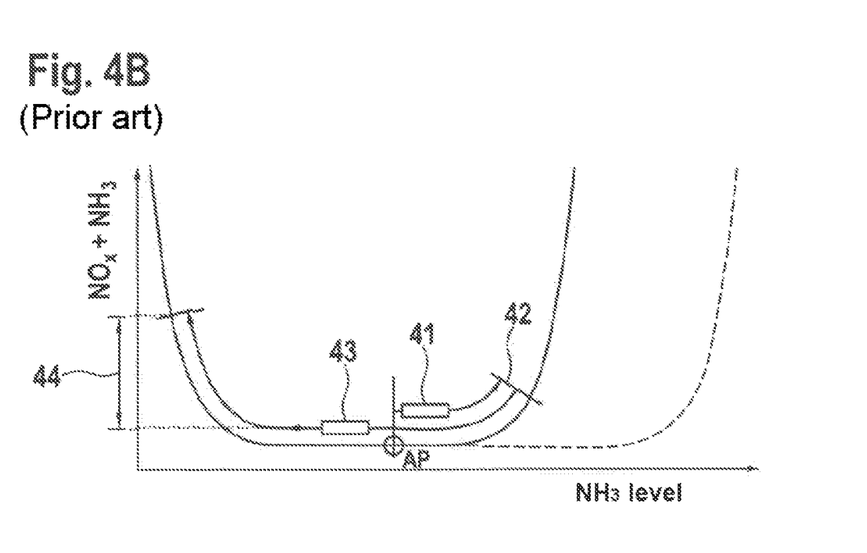

FIG. 4 illustrates the monitoring of $NH_3$ storage capacity in the way it is carried out in conventional methods. FIG. 4A illustrates monitoring in the case of a catalyst which is as good as new. FIG. 4B illustrates monitoring in the case of an aged catalyst. The combined NOx and $NH_3$ signal is shown on the Y axis, this signal being indicated by the NOx sensor downstream of the SCR catalyst. When the $NH_3$ level and hence the NOx conversion rate is low, it consists purely of NOx. If the maximum $NH_3$ level is exceeded, the NOx emissions downstream of the SCR catalyst remain unchanged owing to the high NOx conversion rate. However, $NH_3$ slip occurs, increasing the sensor signal of the NOx sensor. Comparing FIGS. 4A and 4B shows that this effect occurs earlier, i.e. at lower levels, in the case of an aged SCR catalyst due to the lower $NH_3$ storage capacity. Starting from the normal operating point AP (in comparison with FIG. 3, operating point 30, 30', 30"), overmetering 41 is performed until $NH_3$ slip 42 is detected. The emptying test 43 is then carried out. Owing to the lower storage capacity of an aged catalyst (FIG. 4B), this procedure shows a clear measurement effect 44, from which it is possible to infer the state of the catalyst in respect of the $NH_3$ storage capacity thereof. In the known version of this method, which has already been described at the outset, monitoring can be successfully ended when an $NH_3$ level 45 selected as a function of temperature is reached without an effect on emissions in the form of $NH_3$ (due to slip) or due to NOx (in the emptying test) being observed. This can be employed as a rapid detection 46 of the ok state in order to be able to infer an SCR catalyst which is as good as new. The level is calculated using NOx sensors, starting with the model value at the operating point AP, for example.

Figure 5A:
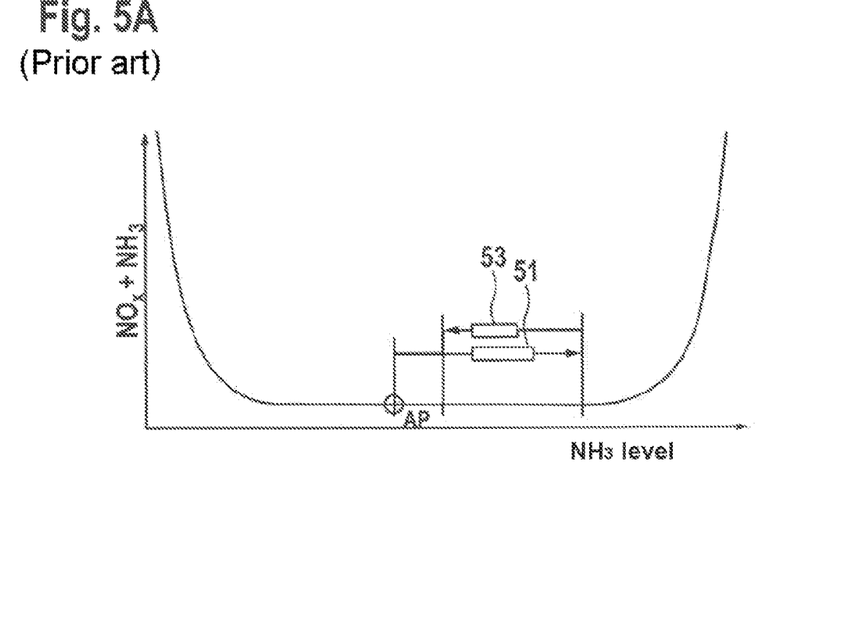
FIG. 5 shows a schematic representation of the relationship between the nitrogen oxide sensor signal downstream of the SCR catalyst and the $NH_3$ level in a known version of the $NH_3$ storage capacity monitoring system in the case of a catalyst which is as good as new (A), in the case of an aged catalyst (B) and in the case of an aged catalyst with an incorrectly calculated operating point (C)
Figure 5B:
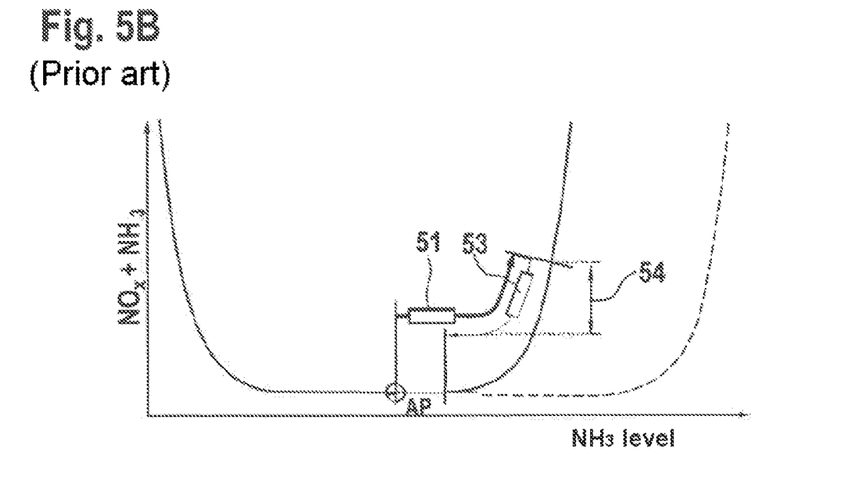
Figure 5C:
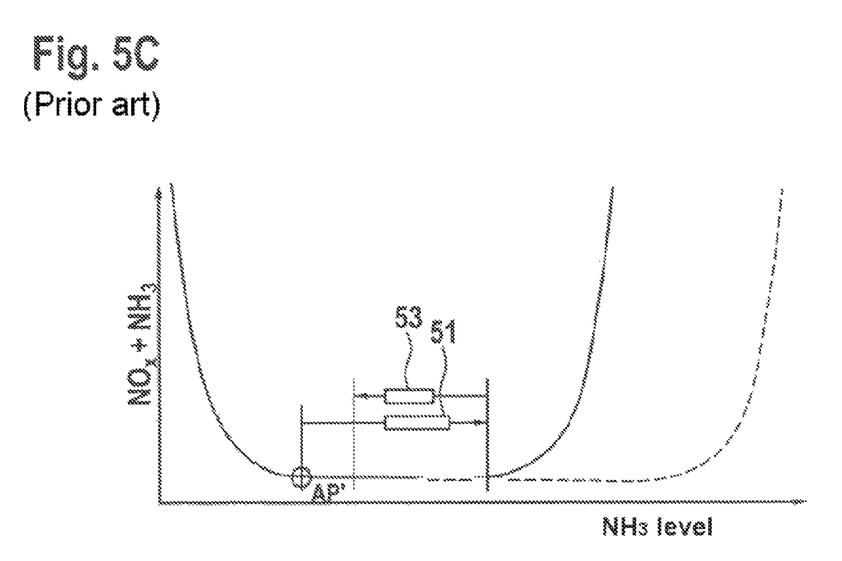

FIG. 5 shows the other version of the $NH_3$ storage capacity monitoring system, which has already been described and is known per se. In this case, a defined quantity of $NH_3$ selected as a function of temperature is metered in during overmetering 51, before a transition is made to the emptying test 53. Overmetering 51 begins at operating point AP, which corresponds to the model value of the normal operating point 30 (FIG. 3). Metering is carried out with a specifiable quantity of $NH_3$. In this case, the amount of $NH_3$ which is made available by the metering device is that which would be sufficient to raise the $NH_3$ level to a specifiable theoretical setpoint, irrespective of whether the installed SCR catalyst can store this amount of $NH_3$ or not. Metering may also continue beyond the slip limit. This is followed by the short emptying test. FIG. 5A shows the situation in the case of a new catalyst. FIG. 5B shows the situation in the case of an aged catalyst. The reduced storage capacity of the aged catalyst can be recognized from the measurement effect 54 in the signal of the NOx sensor downstream of the catalyst (FIG. 5B). FIG. 5C shows the situation in the case of an aged catalyst, in which the operating point AP has been incorrectly calculated. This operating point AP' corresponds to operating point 30' from FIG. 3, for example. The incorrect setting of the operating point is due to model tolerances, incorrect adaptations or the like, for example. In this case, only a small measurement effect, if any, is observed with the monitoring strategy employed. An incorrectly set operating point thus considerably detracts from the informative value of this conventionally employed diagnostic method.

The metering strategy according to the invention for monitoring the $NH_3$ storage capacity of the SCR catalyst envisages the setting of a defined operating point as a starting point for overmetering in the course of diagnosis. In this case, a setpoint is set for the $NH_3$ storage capacity in the SCR catalyst. The advantages of this procedure according to the invention are explained below by means of levels of the kind observed with conventional diagnostic strategies. In conventional strategies, the aim is to set an $NH_3$ level in the SCR catalyst which is selected in such a way that it lies between the maximum storage capacity of a catalyst when new and that of an aged catalyst. The following levels may be observed in this case, for example:

| | |
|---|---|
| operating point | 1 g |
| maximum level of a good-as-new catalyst | 4 g |
| maximum level of an aged catalyst | 2 g |
| diagnostic target value for the $NH_3$ level | 3 g |
| overmetering quantity required | 3 g − 1 g = 2 g |
| actual level after overmetering | 1 g + 2 g = 3 g |

In practice, there is the problem that the operating point often cannot be calculated with sufficient accuracy due to the considerable tolerances. For this reason, the level indicated at the end of overmetering may deviate significantly from the actual level (see FIG. 3). This leads to the following situations, for example:

| | operating point correctly set | operating point set too high | Operating point set too low |
|---|---|---|---|
| indicated operating point | | 1 g | |
| actual operating point | 1 g | 1.5 g | 0.5 g |
| max. level of good-as-new catalyst | | 4 g | |
| max. level of aged catalyst | | 2 g | |
| diagnostic target value for $NH_3$ level | | 3 g | |
| Overmetering quantity required | | 3 g − 1 g = 2 g | |
| actual level after overmetering | 1 g + 2 g = 3 g | 1.5 g + 2 g = 3.5 g | 0.5 g + 2 g = 2.5 g |
| excess quantity of $NH_3$ metered (aged cat.) | 3 g − 2 g = 1 g | 3.5 g − 2 g = 1.5 g | 2.5 g − 2 g = 0.5 g |

For accuracy of diagnosis in a conventional storage capacity monitoring system, e.g. in the second prior art version described, high reproducibility of the excess $NH_3$ mass metered during the overmetering phase is decisive. The deviations inherent in the system, which may account for up to ±50%, as in the above example, entail a large scatter of the diagnostic feature and can thus lead to incorrect diagnoses, as already explained with reference to FIG. 5C, for example.

In order to solve this problem, the method according to the invention envisages carrying out conditioning of the SCR catalyst before the start of diagnosis or before the overmetering phase, during which conditioning the operating point set is one which can be predicted with relatively high accuracy, unlike the setpoint selected by the metering strategy in normal metering mode. For this purpose, the metering of reducing agent is switched to substoichiometric operation, and the SCR catalyst is emptied until the operating point lies in the falling branch of a level/efficiency diagram, that is to say, for example, the operating point 35 in the illustration in FIG. 3. In this case, the NH$_3$ level is known with high accuracy from measurements of the relationship between the NH$_3$ level and efficiency, and this is therefore a very suitable starting point for obtaining accurate information on the NH$_3$ storage capacity in the subsequent overmetering phase.

Figure 6A:
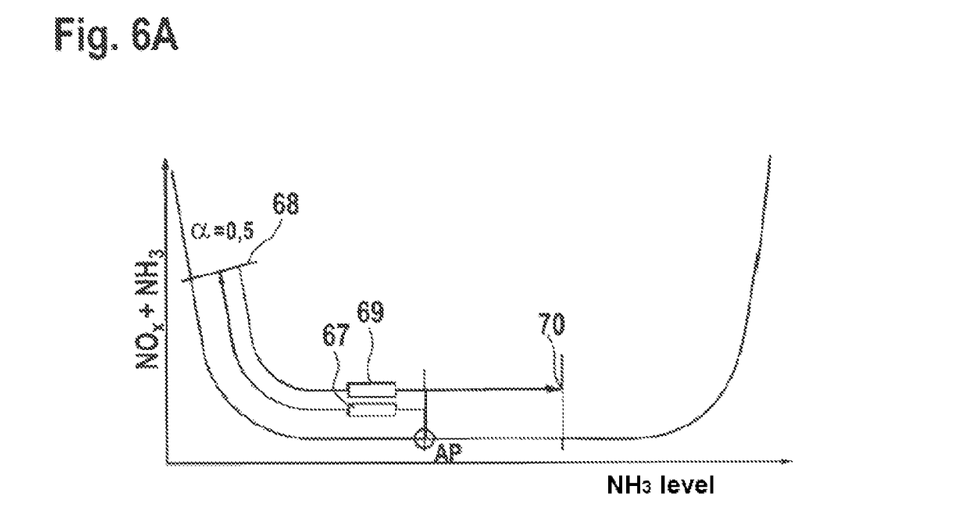
FIG. 6 shows a schematic representation of the relationship between the nitrogen oxide sensor signal downstream of the SCR catalyst and the $NH_3$ level of the catalyst when the monitoring system according to the invention is implemented in the case of a catalyst which is as good as new (A), in the case of an aged catalyst (B) and in the case of a catalyst which is as good as new with an incorrectly calculated operating point (C).
Figure 6B:
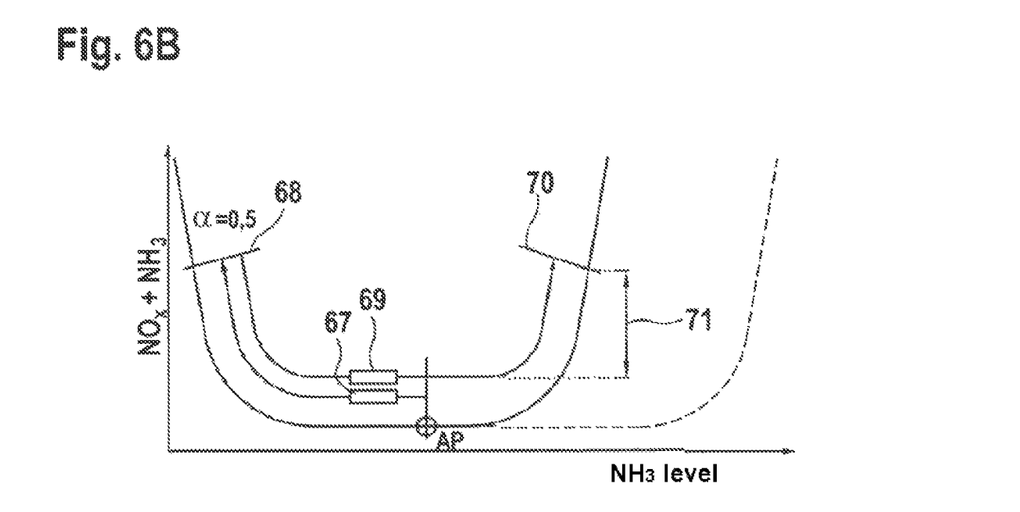
Figure 6C:
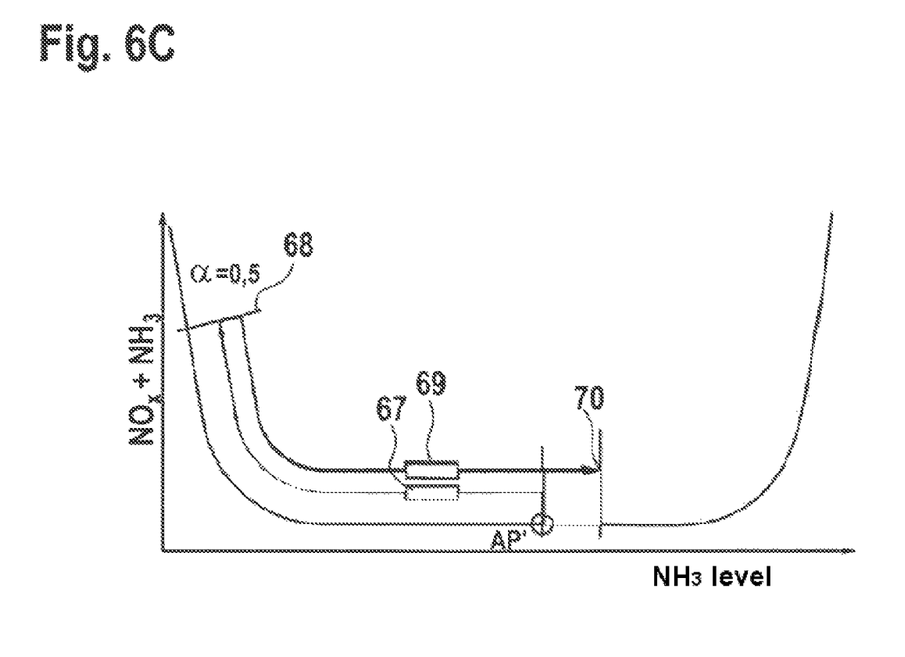

FIG. 6 illustrates the effects of the conditioning phase according to the invention on the results of diagnosis. FIG. 6A shows the situation in the case of a catalyst which is as good as new, FIG. 6B shows the situation in the case of an aged catalyst, and FIG. 6C shows the situation in the case of a catalyst which is as good as new in which the operating point AP' has been incorrectly calculated. Starting from the operating point AP, which, in FIG. 6A and FIG. 6B, corresponds to the normal operating point 30 (model value) from FIG. 3, partial emptying 67 is carried out by switching metering to undermetering, e.g. with α=0.5. In this way, a defined operating point 68 is set, which corresponds to operating point 35 in FIG. 3. This operating point corresponds to a certain level at which the system has settled, which can be calculated, for example, by means of NOx sensor signals, beginning with the model value at the operating point. Setting of this operating point 68 may also take place beyond a rise in the NOx signal. This is followed by the filling 69 of the NH$_3$ store (filling test), up to a certain calculable level 70, for example. By means of the observable NOx sensor signal downstream of the SCR catalyst, it is possible to infer the NH$_3$ storage capacity of the SCR catalyst. Thus, for example, a sensor signal (NOx+NH$_3$) in FIG. 6A which does not increase indicates a catalyst which is as good as new, while the increased sensor signal in FIG. 6B, at the specifiable level 70, indicates an aged catalyst with a reduced NH$_3$ storage capacity as a measurement effect 71. FIG. 6C shows the situation in the case of an incorrectly calculated operating point AP' in the case of a catalyst which is as good as new. Setting the specifiable operating point 68 in the course of the partial emptying of the SCR catalyst does not result in incorrect diagnoses in the subsequent overmetering phase or in the subsequent filling phase 69 (filling test) since the conditioning phase 67 ensures that it is always the same starting point 68 that is set for calculation of the NH$_3$ level in the context of storage capacity diagnosis (filling or overmetering), and the specifiable level 70 is reached irrespective of the initial operating point.

The highest accuracy for the initial value of the NH$_3$ level, i.e. the specifiable operating point, would be obtained if the SCR catalyst were completely emptied. This could be achieved, for example, by complete deactivation of the metering of reducing agent. However, this procedure is associated with a high effect on NOx emissions. Moreover, the conditioning phase in this embodiment has to be carried out for a relatively long period of time, and it must therefore be considered whether the additional gain in accuracy is sufficiently high compared with these disadvantages. In certain applications, however, this embodiment of the method according to the invention may also be advantageous.

The invention claimed is:

1. A method for monitoring an SCR catalyst (12), characterized in that superstoichiometric metering (69) of reducing agent into the SCR catalyst (12) is performed for diagnostic purposes, and the storage capacity of the SCR catalyst (12) is inferred in accordance with at least one characteristic value, which is dependent on a nitrogen oxide conversion rate of the SCR catalyst (12), wherein a conditioning phase (67) for setting a specifiable operating point (35; 68) is carried out before the superstoichiometric metering (69) of the reducing agent, and in that, to set the specifiable operating point (35; 68) in the conditioning phase (67), substoichiometric metering of the reducing agent is performed until the nitrogen oxide conversion rate of the SCR catalyst (12) has a negative gradient and a non-zero value at or below 0.5.

2. The method according to claim 1, characterized in that the conversion rate is determined by means of nitrogen oxide sensor signals at least one of upstream and downstream of the SCR catalyst (12).

3. The method according to claim 2, characterized in that the conversion rate is determined by means of nitrogen oxide sensor signals downstream of the SCR catalyst (12) and by means of calculated model values for nitrogen oxide emissions upstream of the SCR catalyst (12).

4. The method according to claim 3, characterized in that the conversion rate is determined by means of model values for the nitrogen oxide conversion rate which are calculated in the metering strategy.

5. The method according to claim 2, characterized in that the conversion rate is determined by means of model values for the nitrogen oxide conversion rate which are calculated in the metering strategy.

6. The method according to claim 1, characterized in that the conversion rate is determined by means of model values for the nitrogen oxide conversion rate which are calculated in the metering strategy.

7. The method according to claim 1, characterized in that the method is for monitoring the storage capacity of the SCR catalyst (12) for ammonia.

8. The method according to claim 7, characterized in that the specifiable operating point (35; 68) is considered to be set when the ammonia level in the SCR catalyst (12) is below a specifiable limit.

9. The method according to claim 2, characterized in that a time variation in the nitrogen oxide conversion rate of the SCR catalyst during substoichiometric metering (67) is considered, and the achievement of the specifiable operating point (35; 68) is inferred if the conversion rate has a negative gradient.

10. The method according to claim 1, characterized in that a characteristic value for substoichiometric metering is selected in such a way that it is below the characteristic value for stoichiometric metering in the case of an aged SCR catalyst (12).

11. A computer program which executes all the steps of a method in accordance with claim 1 when it is executed on a computing device or a controller (18).

12. A computer program product comprising program code which is stored on a machine-readable medium, for carrying out a method in accordance with claim 1 when the program is executed on a computing device or a controller (18).

* * * * *